April 18, 1961  E. L. TRIMAN  2,979,843
ETCH RATE COMPENSATED PROCESS TIMER
Filed Nov. 25, 1955  4 Sheets-Sheet 1
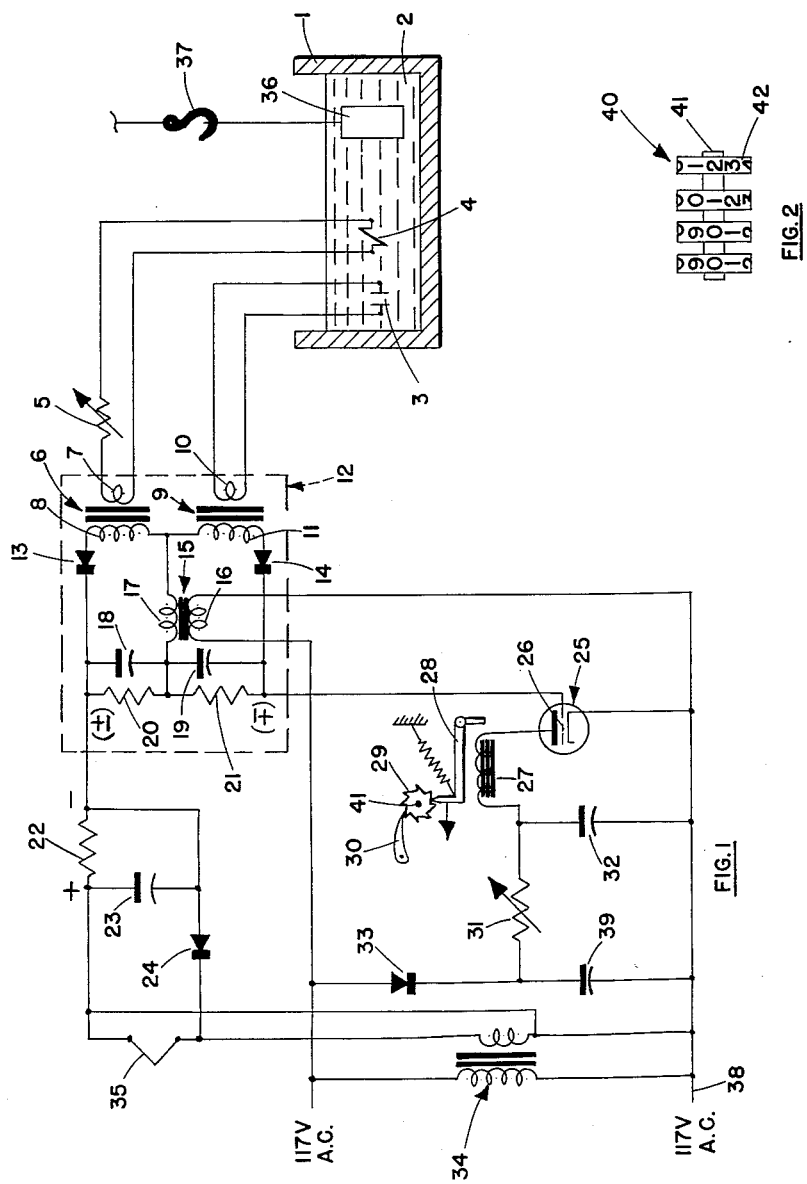
INVENTOR.
EUGENE L. TRIMAN
BY
William R. Lane
ATTORNEY

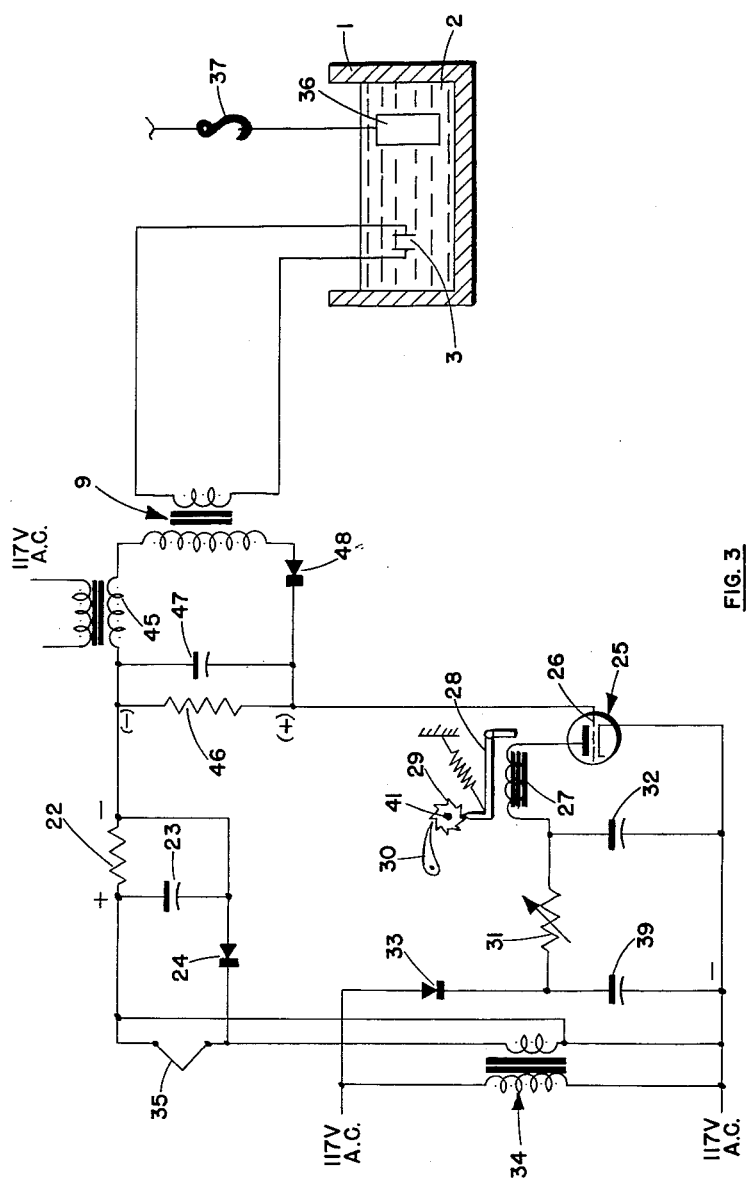

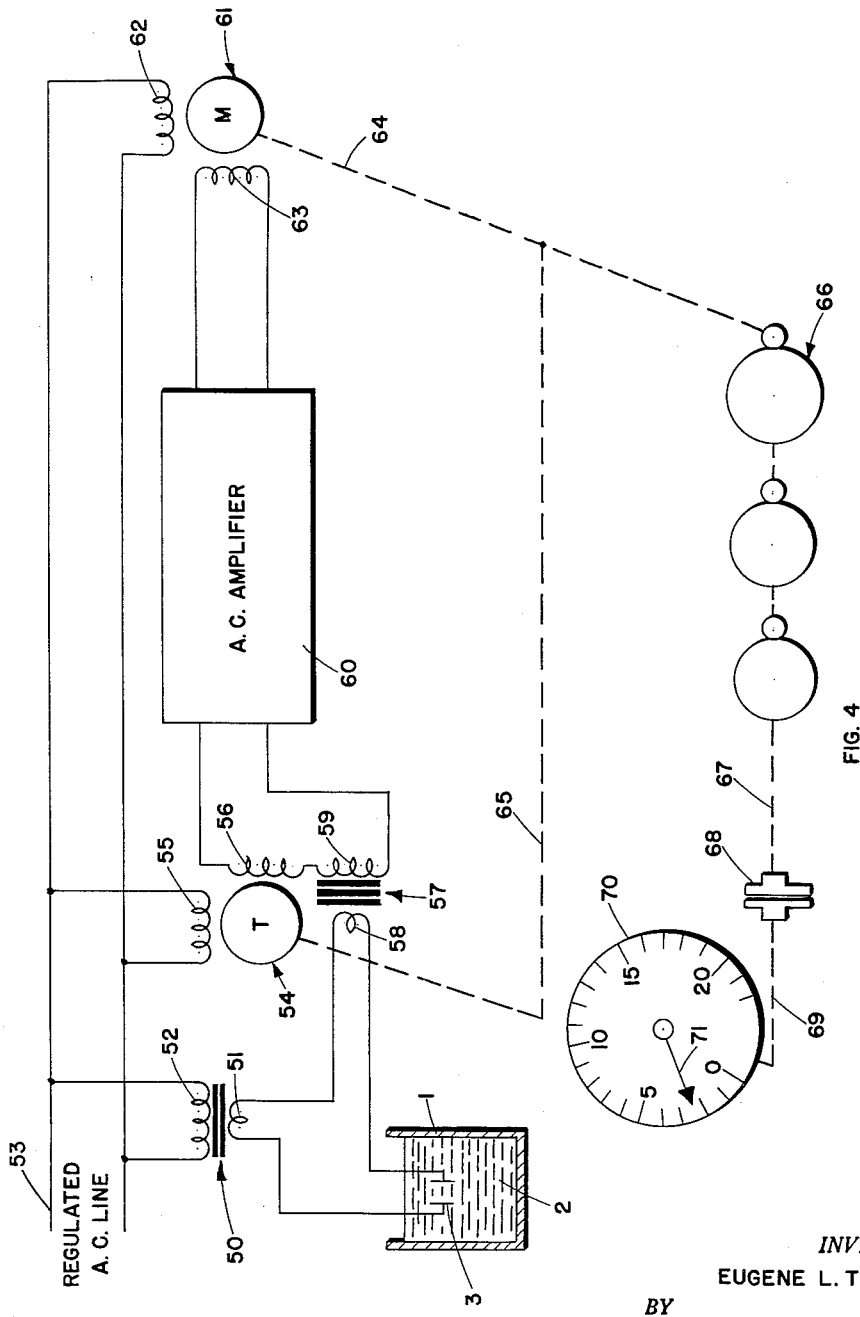

April 18, 1961 E. L. TRIMAN 2,979,843
ETCH RATE COMPENSATED PROCESS TIMER
Filed Nov. 25, 1955 4 Sheets-Sheet 4

INVENTOR.
EUGENE L. TRIMAN
BY William L. Lane
ATTORNEY

United States Patent Office 2,979,843
Patented Apr. 18, 1961

2,979,843

ETCH RATE COMPENSATED PROCESS TIMER

Eugene L. Triman, Whittier, Calif., assignor to North American Aviation, Inc.

Filed Nov. 25, 1955, Ser. No. 548,914

3 Claims. (Cl. 41—9)

The present invention is concerned with an apparatus for controlling etching depth. More particularly, the invention is directed to a means for controlling the total elapsed time that a workpiece is to be etched in order to achieve a predetermined depth of etch. The presently disclosed means senses changes in the etching rate of the etching bath and adjusts the time cycle of workpiece immersion accordingly, thus giving a precise determination of etching depth.

Heretofore, the etching of various materials has been controlled either on a straight time basis or by periodically removing the material from the etchant to physically measure the remaining thickness. It is obvious that the first method does not take into consideration changes in the etching rate which accompany a relatively long-term etching process. The second method is wasteful of time and accuracy due to the periodic removal of the workpiece from the etching bath. The discrepancies arising by these methods are particularly acute when a close tolerance is required in the etched member.

The present means automatically adjusts a series of time increments during which a workpiece is immersed in an etching bath or exposed to etching attack to compensate for variations which occur in the etching rate of the etchant. It is, therefore, not necessary to control the bath or to remove the workpiece from the bath intermittently in order to obtain satisfactory accuracy. The present device eliminates the expense and complexity of automatically maintained control installations consisting of electrical recorders, indicators, metering valves and precision heat controls.

The present invention provides means for deriving a signal proportional to the instantaneous etching rate of the etching solution and means to integrate said signal over finite intervals of time. Various means may be employed to detect changes in the etching rate. Etching rate has been found variously to be a function of parameters such as etchant concentration, bath conductivity, bath temperature, pH and by-product build-up. The invention herein is described in terms of sensing bath conductivity or a bath conductivity and temperature parameter to determine changes in etching rate but is not limited to any specific way of sensing etching rate changes. These parameters are used to control a process timer and to alter time units counted thereby in proportion to the deviation in the bath from a standard condition.

An object of this invention is to provide a means for monitoring the depth of etching in a workpiece.

A further object of this invention is to provide an apparatus for controlling depth of etching.

A still further object of this invention is to provide a means for controlling the depth of metal removal of a metal workpiece.

An additional object of this invention is to provide a means for monitoring the attainment of a predetermined etching depth.

A further object of this invention is to provide an apparatus for controlling the etching of materials by monitoring changes in etching rate and integrating the changes over intervals of time.

Other objects of invention will become apparent from the following description taken in connection with the accompanying drawings, in which Fig. 1 is a schematic of one form of the invention having an electric integrating means;

Fig. 2 is a typical counter indicia means;

Fig. 3 is a simplified modification of the invention;

Fig. 4 is a modified compensated timer with mechanical integrating means;

Figure 5:
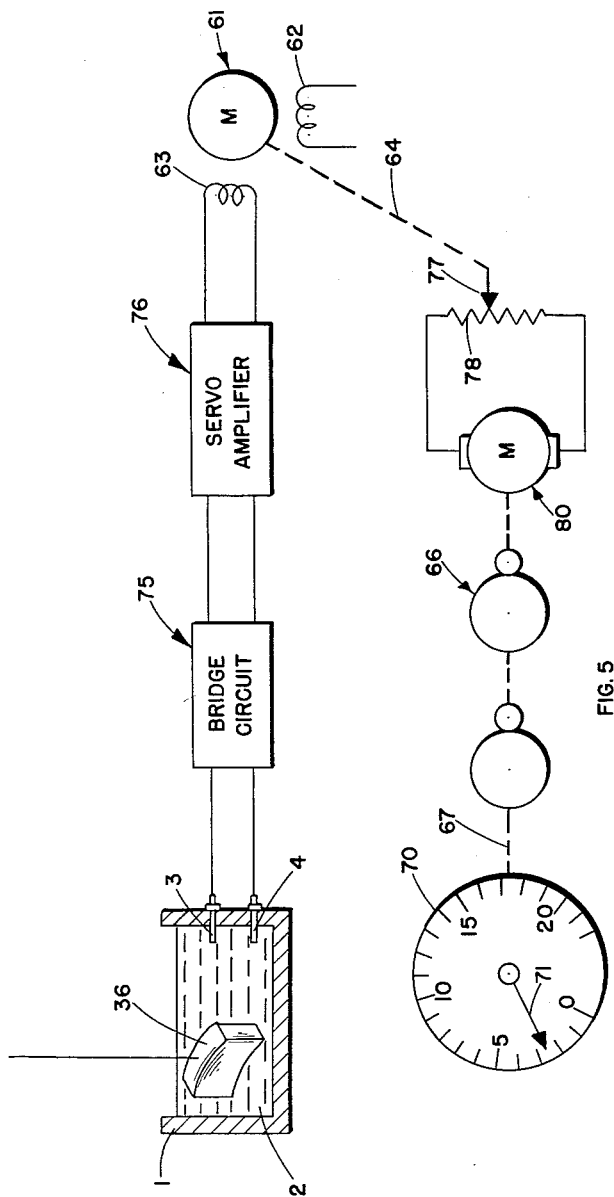

And Fig. 5 is a further modification of the device of Fig. 4.

The apparatus of this invention comprises an etchant solution having a finite etching rate on a metal workpiece, means in the form of an interval counter adapted to count a series of time increments proportional to the etching rate of the solution and means to integrate changes in etching rate to compensate the timed increments for changes in etching rate. With the use of the present invention, the operator uses a standard value of etching rate to determine the elapsed time necessary to obtain a given depth of etch. A counter or timer means is set to trip at the expiration of the number of time intervals which are necessary for obtaining the desired depth of etch. The timer is started when the parts to be etched are immersed in the etchant. A typical etchant for aluminum, for example, is caustic soda (NaOH). Acid etching is generally used for steels and titanium. In the minutes or hours that the work is immersed, the temporal etch rate of the bath is sensed and used for control by extending or shortening each counted interval to compensate for change in the standard rate. This advances or retards the final moment for work removal from the bath so that parts are etched to the same precise depth that would be afforded by a highly controlled bath. Thus, the time duration of each of the time increments based on the standard etch rate are varied proportionally to the sensed changes in etching rate.

Fig. 1 shows a typical circuit for an etched rate compensated process timer. A conductivity cell 3 having a cell constant suitable for the particular etchant used and a temperature resistance bulb 4, are immersed within the etching solution 2 within the etching tank 1. The resistance bulb 4 is connected in series with a calibrating rheostat 5 across the secondary 7 of a signal transformer 6. The conductivity cell 3 is connected across the secondary 10 of a signal transformer 9. Both of the transformers 6 and 9 are designed to reflect an impedance in their primary windings 8 and 11, respectively, which is higher than that of their secondary circuits so that an impedance step-up exists. The transformer primaries 8 and 11 are each in series with a source of alternating current 38 through the primary 16 and secondary 17 windings of a transformer 15. The primary windings 8 and 11 are also in series with a load combination comprising rectifiers 13 and 14, capacitances 18 and 19 and resistances 20 and 21. The group of elements enclosed in the dotted section 12 represent a balanced detector. When the impedance of the two signal windings 8 and 11 are equal, the detector produces zero output voltage across the total resistor load. Changes in the etchant conductivity or temperature will cause a change in the impedance of primary windings 8 or 11, respectively to reflect an unbalance into the detector. When the detector is unbalanced due to unequal voltages being developed across the load resistors a polarized output connected in series with a negative bias supply through resistor 22 controls the bias of the grid 26 of a thyratron tube 25. The thyratron is connected as the switch tube in a relaxation type circuit consisting of a variable resistor 31 a capacitor 32 and a steady source of voltage from source 38 through rectifier 33 and capacitor 39. When the power supply for the steady source of voltage through resistor 31 is first energized the capacitor 32 charges through the resistor 31. When a critical voltage is reached the thyratron switch tube conducts. This permits discharge current of the capacitor 32 to flow through the winding of a step coil 27 until the charge on the capacitor 32 drops to a residual value. At this point the discharge current becomes too small to maintain ionization of the thyratron 25 which quenches and opens the discharge circuit. The above means including capacitor 32 resistor 31 the thyratron 25 provide a means for generating a series of time intervals. The step coil 27, meanwhile, has attracted a spring tensioned armature pawl 28 which engages a ratchet wheel 29 to advance a counter means one position. When current through the coil 27 decays to a value that allows the thyratron switch tube to quench, the pawl 28 disengages the ratchet wheel 29 which remains locked in the advance position by means of a dog 30. The ratchet wheel 29 has a shaft 41 which has conventionally constructed indicia wheels 42 mounted thereon. The counter means 40, the shaft 41 and wheels 42 are seen in detail in Fig. 2.

The firing voltage for the thyratron tube 25 depends upon the value of bias applied to the grid 26. A change in bias will cause the tube to fire at a lower or a higher value of the critical voltage reached by the charging of capacitor 32. The time necessary to accumulate this voltage charge across the capacitor 32 is a function of RC where R is in megohms (of resistor 31)) and C is in microfarads (of capacitor 32). According to established theory, the capacitor 32 will reach 63.2% of the supply voltage in RC seconds. Control of the thyratron firing potential by variation of the bias of its grid 26 provides means for changing the instant of firing so that either a longer or shorter time cycle may be required of the RC combination. The control of firing time is obtained by the balanced detector which alters the resultant bias value applied to the grid 26 in proportion to changes in resistance of the conductivity cell 3 and the temperature bulb 4. The effect is that the cumulative change in these elements 3 and 4 caused by a reduction in bath etch rate lengthens the time cycle or firing intervals of the thyratron, and an increase in bath rate shortens the time cycles by raising or lowering the bias potential applied to the grid 26. This produces fewer or more counts per minute respectively. The result is that the instant when a given total count will be reached is either retarded or advanced. The RC circuit thus functions to produce a nominal time interval that is adjusted by the thyratron under control of the signals received based on changing etching rate. The RC combination in conjunction with the thyratron and step coil act as an electrical integrator for the etch rate signals. The counter is the read-out device for this integration. In effect, the entire circuit varies the time duration of each of any predetermined number of time intervals proportionally to changes in the etching rate. When the final compensated unit count is reached, the timer may close an electrical warning circuit to indicate to the operator that the prescribed depth of etch has been attained or it may energize the hoisting means 37 for removing the workpiece 36 from the etching tank 1. A filament transformer 34 is provided across the alternating current input 38 to provide for heating the filament 35 of the thyratron 25. Half-wave rectification of the voltage from transformer 34 is provided through diode 24. A smoothing condenser 23 is connected in parallel across the rectifier diode 24 and the element 35. As explained above, the voltage across the resistance 22 provides the uncompensated negative bias for the grid 26 of thyratron 25.

Fig. 3 is a modification of the device and circuit described with respect to Fig. 1. In Fig. 3, the sole sense of etching rate is the conductivity cell 3 within the bath 2. As in Fig. 1, the conductivity cell is connected across the secondary signal transformer 9 which is designed to reflect an impedance in the primary winding higher than that of the secondary circuit so that an impedance step-up exists. A 117-volt alternating current supply voltage is supplied to a supply transformer 45 in series with the primary winding of the transformer 9. The output of the primary winding of transformer 9 is rectified through diode 48, passed through a load combination consisting of the resistor 46 and the capacitor 47 to control, with bias voltage developed across resistor 22, the grid 26 of the thyratron 35. The remainder of the elements seen in Fig. 3 function as explained with respect to Fig. 1. Changes in the conductivity of the solution 2 result in a varying impedance in the primary of the transformer 9 and a resultant change in the bias on the grid 26.

Fig. 4 shows a further modification of an etch rate compensator timer which incorporates basically a speed regulated servo system. A regulated alternating current supply 53 is provided for the primary winding 52 of an input tansformer 50. The secondary winding 51 of the transformer 50 provides a reference voltage for the conductivity cell 3 which is immersed in the etching solution 2 within the etching tank 1. The A.-C. voltage induced through the transformer 57 into the secondary winding 59 thereof is a function of the etching rate of the solution 2. As in Figs. 1 and 3, the conductivity cell 3 is connected across the primary 58 of the transformer 57. The ratio of windings in transformer 57 is chosen so that bath conductivity (or bath resistance) produces a significant change in current through the transformer. The winding 56 of an A.-C. tachometer 54 is in series with the secondary winding 59 of the transformer 57. The signal produced by windings 56 and 59 is amplified by amplifier 60 to produce discrete motor speeds of motor 61 in proportion to the signal on winding 63. Reference windings 55 and 62 are provided on the tachometer and motor, respectively. It is to be understood that the signal across transformer 57 may be derived from the illustrated conductivity cell, from a pH measuring instrument, or from a repeating indicator of the Redox potential of the etching bath. A mechanical connection 64, representing motor shaft rotation, is connected through gear train 66 to give a submultiple of the revolutions per minute of the motor 61. The dial 70, which is connected by mechanical linkages 67 and 69 through a clutch 68, thus essentially counts the sub-multiples of the motor revolutions per minute. The dial face may read as minutes of etching time or as a discrete number of mils of etched depth per minute. The clutch 68 is used for disengaging the dial indicator when such indicator is not in use. In operation, the pointer 71 is set at zero when the workpiece is placed within the etching tank 1. Changes in the etching rate of the solution 2, measured conveniently as conductivity in Fig. 4, change the speed at which the tachometer and motor are revolving, thus, shortening or lengthening the time duration which it takes the pointer 71 to progress one scale increment. A feedback linkage 65 is provided to insure having the tachometer at the same speed as the motor 61.

Fig. 5 is a further modification of the basic etch rate timer in which a conventional bridge circuit 75 is provided in series with a servo amplifier 76 to change motor speeds as dictated by changes in a conductivity cell 3 and a temperature measuring resistance bulb 4 placed in the etching solution 2 within tank 1. In Fig. 5, the motor shaft 64 drives a pointer 77 on a speed control rheostat 78 to regulate the speed of a gear driving motor 80. As in Fig. 4, speed reduction gears 66 adapted to drive, through linkage 67, a pointer 71 on a calibrated dial 70. Changes in bath conductivity and bath temperature create changes or unbalances in the bridge circuit 75, the signals from which are amplified by the servo amplifier 76 to change the speed of motor 61. The speed reduction gearing and dial counter of Figs. 4 and 5 thus provide a mechanical integration over finite periods of time of changes in the etching rate of the etching solution 2.

Numerous devices exist for generating intervals which can be controlled in time durations by means of a voltage signal derived from the etch rate parameter. These include vacuum tube resonant frequency oscillators, relaxation oscillators, astable multivibrators and pulse generators. In addition, interval counters or integrators are available for the summing function through a range of numbers of generated intervals in the form of electrical devices, such as neon lamp counting circuits, bistable multivibrators, charging diodes in conjunction with an RC circuit, multi-element vacuum tube circuits in which counting is accomplished by cathode beam deflection and relay switching circuits. Electromagnetic counters are well-known to the art. Mechanical counting and integrating devices also exist including ball and disc integrators and further variations of the ratchet wheel principle in the form of accumulators operable from a shaft rotation provided by a motor such as seen in Fig. 4.

Although the invention has been described and illustrated in detail, it is to be clearly understood that the same is by way of illustration and example only and is not to be taken by way of limitation, the spirit and scope of this invention being limited only by the terms of the appended claims.

I claim:

1. For use with an etchant solution having a finite etching rate on a metal workpiece, a compensated process timer comprising a counter adapted to indicate a prescribed number of time intervals corresponding to a desired etch depth on said workpiece based on said finite etching rate, means to sense changes in etching rate, a balanced detector, and a thyratron tube adapted to operate a relaxation-type circuit for moving said counter through each time interval, changes in etching rate being adapted to unbalance said detector, the unbalanced output of said detector being connected in series to the bias grid of said thyratron whereby the time duration of each time interval is adjusted proportionately to said changes in etching rate.

2. The invention as set out in claim 1 in which a sense of conductivity of the solution and a sense of temperature of the solution are supplied across the secondaries of a pair of signal transformers, the primaries of said transformers being in said detector and reflecting equal impedances at said finite etching rate.

3. The invention as set out in claim 1 in which said relaxation-type circuit comprises a resistor, a capacitor, and a voltage source and is connected to a step coil adapted to move said counter.

References Cited in the file of this patent

UNITED STATES PATENTS

| | | |
|---|---|---|
| 1,995,890 | Lord | Mar. 26, 1935 |
| 2,436,762 | Turin et al. | Feb. 24, 1948 |
| 2,724,918 | Triman | Nov. 29, 1955 |
| 2,739,047 | Sanz | Mar. 20, 1956 |